Dec. 11, 1962    T. O. PATTON ET AL    3,067,463
APPARATUS FOR CONTINUOUS PELLET PRECIPITATION OF
ORGANIC ACID ESTERS OF CELLULOSE
Filed April 28, 1960    2 Sheets-Sheet 2
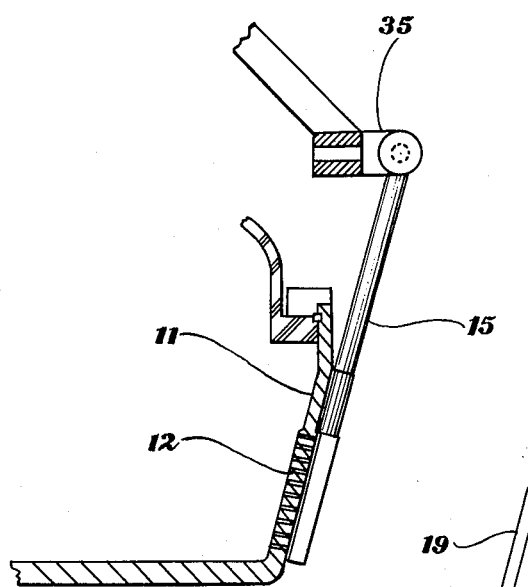
*Fig. 2*
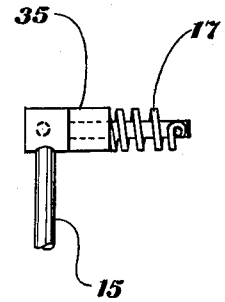
*Fig. 3*
*Fig. 4*
Thomas O. Patton
Charles A. Smith
INVENTORS
BY
ATTORNEYS 3,067,463
APPARATUS FOR CONTINUOUS PELLET PRECIPITATION OF ORGANIC ACID ESTERS OF CELLULOSE
Thomas O. Patton and Charles A. Smith, Kingsport, Tenn., assignors to Eastman Kodak Company, Rochester, N.Y., a corporation of New Jersey
Filed Apr. 28, 1960, Ser. No. 25,421
3 Claims. (Cl. 18—12)

This invention relates to an improved apparatus for the continuous pellet precipitation of cellulose organic acid esters including cellulose organic mixed acid esters from their esterification solutions.

In the precipitation of cellulose esters from their esterification solutions, commonly termed "acid dopes," there are two general methods used in the industry, i.e., the flake precipitation method, and the powder precipitation method.

The flake precipitation method involves the mixing of the acid dope solution of the cellulose ester with a nonsolvent such as water or weak acid.

The powder precipitation method employs the controlled addition of the non-solvent to the acid dopes to produce a powdery precipitate. The precipitated ester is then separated from the weak acid, washed, partially dewatered, and then dried.

In British Patent 790,039, another method is described in which the precipitated material, in the form of filaments, is carried through the preliminary precipitation vessel on a belt from which it is fed to a cutter and reduced to short lengths. The particles may then be further aged or hardened prior to the separation of the ester particles from the non-solvent and then washed free of acid and dried.

It is an object of this invention to provide a better apparatus for the continuous pellet precipitation of cellulose acetate and other cellulose esters of organic and mixed organic acids from their corresponding acid dope solutions, and to accomplish this end in a manner suitable for a large scale production operation. Other objects will appear hereinafter.

In accordance with the present invention, the acid dope of the cellulose ester in its organic acid is pumped into a conical extrusion die mounted to rotate in a horizontal plane such that the base of the conical die surface is upward. The conical die surface contains a large number of small die orifices through which the acid dope is extruded. Sixteen stationary knives are arranged radially around the die, and brought to bear against the conical die surface by spring-loaded arms in which the knives are pivotally mounted. The extrusion die and knives protrude downward into a tank and are submerged in the ester precipitating liquid contained in the tank. As the acid dope extrudes through the die orifices in the rotating die it is cut into small spherical pellets by the stationary knives. The pellets are swept away from the knives in a liquid slurry. Under proper conditions of operation a membrane of precipitated cellulose ester forms on the pellets' surfaces. The slurry of pellets is swirled by the action of the rotating die in the tank and allowed to flow out of the bottom of the tank to a collecting tank.

The present invention will be further understood from the following description with reference to the drawings in which:

FIG. 2 is a section of the conical extrusion showing a knife blade held thereagainst;

FIG. 3 is a side view of the spring arrangement for holding the knife blades against the die face; and FIG. 4 is a view showing how the knife blade is attached to its supporting rod.

Figure 1:
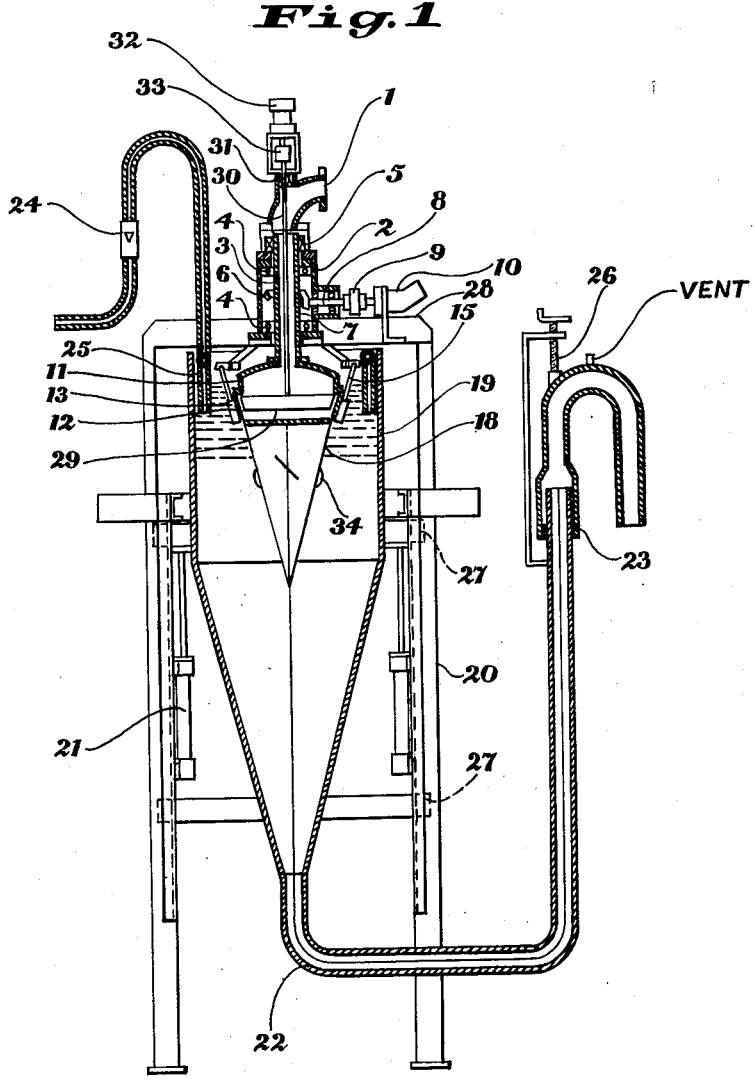
FIG. 1 is a view in elevation, partly in section of the apparatus of this invention.

Referring to FIGS. 1 and 2, the apparatus and its operation is now described. The cellulose ester-acid dope solution to be formed into pellets enters the apparatus under pressure at the fixed inlet elbow 1, mounted on gear box 2. Flowing through elbow 1, the dope enters the vertical, hollow, main shaft 3, which is rotatably mounted in bearings 4 in gear box 2. A mechanical seal 5 prevents loss of dope pressure where the fixed inlet elbow abuts the rotating main shaft 3. The rotating main shaft 3 is driven through a ring bevel gear 6 mounted on the main shaft 3 and pinion bevel gear 7 mounted on a bearing-supported input shaft 8. Input shaft 8 is connected by a coupling 9 to a hydraulic motor 10 and thereby driven when the motor is actuated. The cellulose ester-acid dope continues down main shaft 3 into extrusion die 11, which is attached thereto, and outward through die orifices 12 in the conical die surface. Pellets are formed as the acid dope is cut off upon passing the knives 13, which are clamped by knife holders 14.

The knife holders 14—see FIG. 4—are mounted on pivot pins 16 in the knife arms 15, so that the holders are free to rotate in a vertical plane. Knives 13 are mounted such that the straight cutting edge lies on a vertical element of the die cone surface, and pivot pins 16 allow knife holders 14 and knives 13 to rotate in a plane parallel to the vertical cone element. Knife arms 15 are pivotally mounted in knife mountings 35 and bring knives 13 to bear against die 11 by springs 17. Knife arms 15 pivot in vertical planes parallel to the axis of the cone. As knives 13 wear and shorten, knife arms 15 pivot to maintain knives 13 in contact with die 11. Fixed to and rotating with die 11 is an extension 18 of the conical surface of the die 11 upon which is mounted a number of vanes 34. The extrusion die 11, knives 13, and extension 18 protrude downward into tank 19 containing the ester precipitating liquid and are immersed in that liquid.

The extension 18 presents a large surface area to the precipitating liquid and in operation rotates the vanes 34 to cause the liquid to circle the die 11.

The acid dope pellets upon contact with the precipitating liquid, form a membrane of cellulose ester on their surface and are carried away from the die and the knives by the circulating liquid. Having a higher specific gravity than the precipitating liquid, the pellets settle downward in tank 19. A constant flow of precipitating liquid is metered into tank 19 by rotameter 24 through pipe nozzles 25. The liquid flows out the lower end of the tank 19 through outlet pipe 22 and up through the adjustable joint 23 carrying the pellets with it. The adjustable joint 23 may be raised and lowered relative to tank 19 by screw 26 to adjust the level of the liquid in tank 19. Tank 19 is mounted in support frame 20 by means of slide bearings 27 and may be lowered by hydraulic cylinders 21 away from the die 11 so as to provide access to the die and knives 13.

Die 11 is supported by gear box 2 which is fixed on upper frame 28 mounted on support frame 20. Plug 29 is mounted inside die 11 and conforms exactly to the inner surface of extrusion die 11, and is supported by shaft 30. Shaft 30 extends through a pressure seal 31 and bearing joint 33 and is attached to a hydraulic cylinder 32. The plug 29 may be lowered by cylinder 32 to fit inside of the die 11 and close off the die orifices 12 thereby preventing flow of acid dope. The plug 29 is a means of stopping the operation and also prevents the precipitating liquid from entering the die orifices 12 and precipitating dope inside the die assembly when the dope is not under pressure.

This invention is further illustrated in the following examples.

*Example 1*

A filtered cellulose acetate acid dope, with 25,000 to 35,000 centipoises viscosity at 115° F. and with 14.7% solids in the dope and hydrolyzed to 40.0% acetyl based on the weight of the ester, is pumped through the inlet elbow 1 and down through the main shaft 3 into the extrusion die 11. Prior to this the precipitation tank 19 has been filled to the correct level above the die with 10% acetic—90% water weak acid at 60° F. which is the precipitant. The hydraulic motor 10 has also been actuated and set to rotate a 24-inch diameter extrusion die at 120 r.p.m. When this has been done the plug 29 is raised by suitably actuating the hydraulic cylinder 32 which allows the dope to be extruded out through the die apertures 12 in the conical die surface. There are approximately 4800 die apertures in the die which are 3/32 inch in diameter. Five hundred seventy pounds per minute of dope are delivered to the extrusion die at 20 p.s.i.g.

The dope extrudes through the die apertures in the rotating extrusion die and forms droplets on the face of the die. These droplets immediately form a skin or membrane of precipitated cellulose acetate on their surface since they are beneath the liquid precipitant in the precipitating chamber. As the droplets of dope are formed, they are cut or sliced from the face of the rotating conical die surface by sixteen stationary knives, which have a four-inch cutting edge. In order for the cutting operation to function satisfactorily, the cutting knives must ride or bear continuously on the face of the die so that no skins or strings of precipitated acetate can foul the edge of the knives. This is accomplished as explained in the above description of the apparatus. This arrangement also allows for the easy removal and replacement of worn or damaged knife blades without stopping the operation of the apparatus and makes the blades automatically compensate for wear and continuously maintain proper alignment as they wear.

During the precipitation operation, the weak acetic acid precipitating medium is continuously metered through rotameter 24 into the precipitator at a rate which gives a final precipitation acid concentration of 31% acetic acid, after the pelleted acetate has aged or cured out.

The pellets are formed when the droplets of dope are separated from the rotating die face by the stationary knives. These pellets are approximately 1/8" diameter spheres and are swept away from the stationary knife blades by the precipitating acid which is swirling in the precipitation tank. Since there are no rotating knives or knife holders there is less danger of the soft, partially precipitated pellets becoming damaged due to contact with these parts.

The droplets of dope or pellets are now completely covered by the precipitated skin of cellulose acetate but the center of the pellet is still a solution which slowly precipitates as the non-solvent, precipitating liquid migrates into the center of the pellets. Since the specific gravity of the pellets is greater than that of the precipitating acid, the pellets settle down through the precipitation chamber and are carried out through the discharge line 22 as a slurry of pellets and precipitant. The liquid level in the precipitation chamber is maintained by the adjustable overflow leg 23 which is vented to the atmosphere. The difference in the height of the overflow leg and the liquid level in the precipitator is maintained to just overcome the pressure drop in the discharge line to allow the slurry to discharge.

The pellet precipitation may be carried out continuously as long as the cellulose acetate dope is available. If for reasons of maintenance or lack of dope it becomes necessary to stop the precipitator, this may be done very easily by stopping the dope pump and then immediately closing the plug to stop the flow of dope. Then the die rotation may be stopped. The plug also prevents the precipitating acid from passing through the holes into the die and precipitating the dope inside the die head which would plug the holes in the die. The precipitation acid may then be shut off and drained out if necessary. The start up procedure would then be the reverse of this operation.

*Example 2*

Our apparatus may also be used to pellet precipitate a filtered cellulose acetate acid dope in which the cellulose ester contains 39.4% acetyl by weight but is 18% solids by weight and has only 15,000 centipoises viscosity at 115° F.

The pellet precipitation of this dope is done in the same manner as in the preceding example with a few exceptions which are as follows:

(a) The dope is cooled to 100° F. by some suitable means before precipitation.

(b) The precipitation acid is cooled to 40° F.

The product from a precipitation device and method in accordance with the present invention would be in the form of round pellets or spheres which have a membrane or skin of precipitated cellulose ester on the outside and a honey-combed or porous interior. This interior is filled with the precipitation acid which is removed by a washing step. The size of the pellets may be controlled to some extent by varying the speed of the rotating die when a constant dope pumping rate is used.

A savings in the yield of the amount of cellulose ester recovered from the precipitation slurry is realized when the acid dope is pellet precipitated rather than flake or powder precipitated by conventional means. This savings is in the reduced amount of a very fine precipitate that is made during the precipitation operation which is normally lost when the precipitation acid is separated from the precipitated ester and in the reduced amount of soluble ester in the precipitation acid. This savings may amount to as much as 0.07% (based on the total weight of precipitating acid) more ester recovered when pellet precipitated than when flake precipitated at the same final precipitation acid concentration, which in this case was 31%.

*Example 3*

An acid dope of cellulose acetate propionate was pelleted by employing the method and apparatus of this invention by following the condition set forth in Example 1.

*Example 4*

An acid dope of cellulose acetate butyrate was also pelleted by employing the method and apparatus of this invention by following the conditions set forth in Example 1.

Our novel apparatus can be employed to pellet precipitate cellulose acetate esters from their corresponding acid dope solutions which range from 39.4% acetyl to 44.0% acetyl based on the weight of the ester. It is also operable on cellulose acetate esters of even lower acetyl value. The esters, however, become increasingly difficult to pellet as the degree of hydrolysis is increased.

The ability to pellet precipitate the acid dope of an organic acid ester of cellulose in its corresponding organic acid by our invention is dependent on several factors, i.e. the degree of hydrolysis, the temperature of the dope, the viscosity of the dope at said temperature, and the temperature of the slurry in the precipitation chamber.

As to degree of hydrolysis, esters with acetyl values from the triester to 39.4% acetyl have been successfully pelleted.

The upper limit on the temperature of the acid dope for the successful operation of this invention is dependent on the minimum acid dope viscosity which will give good pellets for a particular type ester. The minimum viscosity at which it has been possible to make good pellets is approximately 9000 centipoises. The more this viscosity can be increased for a particular ester by cooling of the acid dope or by increasing the percent solids in the dope, the better the process may be expected to operate. The upper limit of viscosity is dependent only on the pressure drop that can be tolerated in the lines or equipment.

The maximum temperature of the slurry in the precipitator that can be tolerated must be determined for each type of ester. The temperature employed should be one which does not cause the pellets to cohere. In general the lower the percent acetyl, the stickier the pellets seem to be. Thus, for an ester having an acetyl content of 40% the maximum temperature range of the slurry for a good operation is 70 to 75° F., but for an ester containing 39.4% acetyl, the maximum temperature range is 60 to 65° F. The lower the temperature can be maintained, the better the precipitation operation will be. The lower limit of this temperature is tied in with the economies of cooling the precipitation medium rather than the requirements of the process.

We have found for a 24-inch diameter rotating die precipitator with 16 stationary knives, the apparatus will function properly between 100 and 140 revolutions per minute. Below 100 r.p.m. the pellets may stick together as they are cut off, and above 140 r.p.m. the pellets are deformed due to the centrifugal force exerted upon the droplets of dope as they are formed by the rotation of the die. The rate at which the die head is driven will determine the size of the pellets which are made for a set dope pumping rate. The size of the die orifices will also influence the pellet size. Die orifices with diameters from 1/16 inch to 1/8 inch have been used successfully and slightly larger or smaller diameter die orifices can be used with equal success.

Our invention may be employed to precipitate, in the form of pellets, organic acid esters of cellulose such as cellulose acetate, propionate, butyrate and mixtures of these. It is useful in the production of large quantities of these esters in a pellet form which are of uniform particle size. These pellets are easily separated from the non-solvent liquid used to precipitate the ester.

Our apparatus eliminates the production of fine particles of precipitated ester which are very difficult to remove from the precipitant.

The pellets have free flowing characteristics and are adaptable to a continuous washing type of operation. The pellets have a high bulk density after washing, dewatering, and drying. The pellets also dissolve easily and rapidly in the solvents normally employed for the esters.

Our apparatus also has advantages in savings over regular precipitation apparatus due to reduced loses of both soluble and insoluble fractions of the esters in the precipitation liquids.

These dense, free flowing pellets formed as described above may be readily dissolved in a solvent for spinning into cellulose ester filaments or for casting into a film. Or they may be ground into a powder, mixed with plasticizers, and stabilizers in proportions well known to those skilled in the art, worked on hot rolls, cooled and cut into plastic pellets for use in injection molding of various plastic articles.

We claim:

1. In apparatus for the pellet pricipitation of cellulose organic acid esters,
   (1) a movable precipitating chamber having an open top,
   (2) means for supporting said chamber,
   (3) means for moving said chamber in a vertical direction on said supporting means,
   (4) means for supplying precipitating fluid to said chamber,
   (5) means for regulating the level of the precipitating fluid in said chamber,
   (6) means for removing precipitating fluid and pellets from said chamber,
   (7) a rotatable extrusion die positioned above the open top of said chamber having a hollow interior, a flat exterior face, and a plurality of die orifices extending from the interior through said face, said die being immersed in said precipitating fluid on upward movement of said chamber,
   (8) means for rotating the die,
   (9) means for supplying a solution to be pelleted to the interior of said die,
   (10) means for forcing said solution through said die orifices into the precipitating solution in said chamber,
   (11) valve means disposed within the interior of the rotatable extrusion die for controlling flow of fluid through the die orifices, and
   (12) stationary cutting means positioned to bear against the face of the rotatable extrusion die in the vicinity of said orifices.

2. In apparatus for the pellet precipitation of cellulose organic acid esters,
   (1) a precipitating chamber comprising a cylindrical top and a conical bottom,
   (2) a rotatable hollow extrusion die assembly positioned within said precipitating chamber having a conical wall portion, a flat bottom portion, an enclosing cap portion, and a plurality of die orifices extending through the wall portion,
   (3) a vertically movable valve means adapted to close off the die orifices positioned within the interior of the die,
   (4) a conical member extending from said flat bottom portion and having a common base therewith, said conical member having a plurality of stirring vanes on the exterior thereof,
   (5) means for rotating the die assembly,
   (6) a plurality of stationary knives positioned in contact with the conical wall of the die and adapted to sever solution extruded through the die orifices.
   (7) a conduit in fluid communication with the conical bottom of the chamber for removing fluid and pellets therefrom,
   (8) a conduit in fluid communication with said die assembly for conducting cellulose ester solution to the interior of the die,
   (9) a conduit in fluid communication with said chamber for conducting precipitating fluid thereto, and
   (10) level control means adapted to control the level of the fluid in the said chamber.

3. In apparatus for the pellet precipitation of cellulose organic acid esters.
   (1) a precipitating chamber comprising a cylindrical open-ended top and closed conical bottom,
   (2) a rotatable hollow extrusion die having an exterior surface and a plurality of die orifices therein positioned centrally above said precipitatiing chamber, (3) means for filling the precipitating chamber with a precipitating liquid,
(4) means for vertically moving the chamber to a position so that the die is immersed in said liquid,
(5) means for rotating the die assembly,
(6) means for forcing solution through said die orifices,
(7) stationary cutting means positioned in contact with the exterior surface of extrusion die for severing solution extruded through said die orifices into pellets,
(8) a conduit in fluid communication with the conical bottom of the chamber for removing liquid and pellets,
(9) a level control adapted to maintain the liquid level of the die during operation of the process, and
(10) vertically movable valve means positioned within the rotatable hollow extrusion die and adapted to control the flow of fluid through said die orifices.

References Cited in the file of this patent

UNITED STATES PATENTS

| | | |
|---|---|---|
| 1,768,365 | MacFarlane | June 24, 1930 |
| 2,006,586 | Downard | July 2, 1935 |
| 2,021,837 | Davidson | Nov. 19, 1935 |
| 2,651,269 | French | Sept. 8, 1953 |

FOREIGN PATENTS

| | | |
|---|---|---|
| 820,729 | Great Britain | Sept. 23, 1959 |